United States Patent [19]
Ketting et al.

[11] Patent Number: 6,062,327
[45] Date of Patent: May 16, 2000

[54] TRACKED-VEHICLE DRIVE

[75] Inventors: Michael Ketting, Ennepetal, Germany; Piotr Dudzinski; Radoslaw Cieslak, both of Wroclaw, Poland

[73] Assignee: Intertractor Zweigniederlassung der Wirtgen GmbH, Gevelsberg, Germany

[21] Appl. No.: 09/162,896

[22] Filed: Sep. 29, 1998

[30] Foreign Application Priority Data

Oct. 11, 1997 [DE] Germany ............ 197 43 494

[51] Int. Cl.[7] .................................. B62D 55/30
[52] U.S. Cl. .................. 180/9.52; 305/144; 305/184; 305/195
[58] Field of Search ................ 180/9.62, 9.1, 180/9.5, 9.52; 305/125, 143, 144, 145, 184, 60, 195

[56] References Cited

U.S. PATENT DOCUMENTS

| | | | |
|---|---|---|---|
| 2,618,516 | 11/1952 | Smith | 305/9 |
| 3,910,649 | 10/1975 | Roskaft | 305/10 |
| 3,994,352 | 11/1976 | Siorek | 180/9.2 |
| 5,018,591 | 5/1991 | Price | 180/9.5 |
| 5,316,381 | 5/1994 | Isaacson et al. | 305/10 |
| 5,334,106 | 8/1994 | Purcell | 474/110 |
| 5,515,936 | 5/1996 | Lagace | 180/9.1 |
| 5,531,282 | 7/1996 | Jennen | 180/9.1 |
| 5,566,773 | 10/1996 | Gersmann | 180/9.5 |
| 5,728,019 | 3/1998 | Becker . | |

*Primary Examiner*—Paul N. Dickson
*Assistant Examiner*—Tony Winner
*Attorney, Agent, or Firm*—Herbert Dubno; Andrew Wilford

[57] ABSTRACT

A tracked-vehicle drive has a wheel rotatably driven about an axis and having an outer surface, an endless traction element spanned over and frictionally engaging the wheel so as to be advanced thereby when the wheel rotates and having an inner face formed with an endless row of spaced teeth, and an auxiliary drive member displaceable adjacent the traction element and formed with an endless row of spaced entrainment formations in constant mesh with the teeth so that the drive member is displaced synchronously with the traction element. A coupling body having entrainment formations in constant mesh with the drive-member entrainment formations is engageable with the wheel outer surface. The body can be coupled to the wheel for positive driving of the traction element from the wheel via the member and body and can be decoupled from the wheel for frictional coupling of the traction element by the wheel.

12 Claims, 14 Drawing Sheets

TRACKED-VEHICLE DRIVE

SPECIFICATION

1. Field of the Invention

The present invention relates to a tracked vehicle. More particularly this invention concerns a drive for a tracked vehicle.

2. Background of the Invention

A standard tracked-vehicle drive such as described in commonly owned U.S. Pat. No. 5,728,019 has a wheel rotatably driven about an axis and having an outer surface and an endless traction element spanned over and frictionally engaging the wheel so as to be advanced thereby when the wheel rotates and having an inner face formed with an endless row of spaced teeth. Normally the element is spanned over a second reversing or idler wheel that is biased away from the driven wheel to keep the element taut.

The teeth on the inner surface of the element serve to keep the element aligned in the wheels that have radially outwardly open grooves. The reason that the element is formed with discrete teeth as opposed to a continuous ridge is that the teeth make the element more flexible and are just as effective as a ridge in keeping the element from slipping axially off either of the wheels.

The main problem with such systems is that the driving torque is transmitted wholly by frictional engagement of the element with the wheel. Since the element is normally a somewhat stretchy and elastic belt, it cannot be tensioned too much without breaking. Thus if the wheel surface, for instance, gets wet, the friction between the wheel and the element decreases and the element can slip, causing the vehicle to lose traction.

It has been suggested to provide auxiliary drive systems that positively couple the belt to the wheel. These systems normally function all the time and therefore have the disadvantage that they can damage the belt. Furthermore such systems must be incorporated into the vehicle on manufacture and cannot conveniently be added later as a retrofit. Furthermore the known systems do not allow the positive coupling to be disconnected so that the advantages of the frictional drive, principally that it prolongs the life of the traction element, are lost.

OBJECTS OF THE INVENTION

It is therefore an object of the present invention to provide an improved tracked-vehicle drive.

Another object is the provision of such an improved tracked-vehicle drive which overcomes the above-given disadvantages, that is which allows the user to optionally switch between friction and positive drive.

A further object is to provide such a drive system that can readily be retrofitted to an existing friction-drive system.

SUMMARY OF THE INVENTION

A tracked-vehicle drive has according to the invention a wheel rotatably driven about an axis and having an outer surface, an endless traction element spanned over and frictionally engaging the wheel so as to be advanced thereby when the wheel rotates and having an inner face formed with an endless row of spaced teeth, and an auxiliary drive member displaceable adjacent the traction element and formed with an endless row of spaced entrainment formations in constant mesh with the teeth so that the drive member is displaced synchronously with the traction element. A coupling body having entrainment formations in constant mesh with the drive-member entrainment formations is engageable with the wheel outer surface. The body can be coupled to the wheel for positive driving of the traction element from the wheel via the member and body and can be decoupled from the wheel for frictional coupling of the traction element by the wheel.

Thus this arrangement allows the operator of the vehicle to switch between the belt-preserving friction drive or the more powerful positive drive. What is more the system can be mounted in an existing friction-drive vehicle as a retrofit since it is not incorporated in the drive wheels thereof.

According to the invention the body is a roller radially engageable with the wheel and the entrainment formations of the body are teeth spaced like the teeth of the wheel. The wheel is formed with an endless radially outwardly open continuous groove in which the teeth of the element engage. The teeth of the body engage in the groove when the body is coupled to the wheel. The body is provided with an outer soft friction-enhancing layer. Thus it is possible to achieve substantially greater torque transmission between the body and the wheel than between the wheel and the traction element.

The member according to the invention can be a roller formed with pockets complementary to the teeth. In addition the drive can have a pair of such drive members oppositely flanking the body and engaged with different stretches of the element. In these system the coupling means is an actuator operable to displace the body radially of the wheel. The drive can have a pair of such drive members.

The member in accordance with the invention can include an endless belt formed with an endless row of holes forming the respective entrainment formations and a pair of rollers over which the belt is spanned and forming in the belt a stretch extending parallel to and in engagement with the inner face of the traction element. This system is particularly easy to retrofit to a tracked vehicle.

The member can similarly be an endless belt spanned over the wheel and formed with an endless row of holes forming the respective entrainment formations. The body in this case is a toothed wheel over which the endless belt is spanned. A releasable torque-transmitting clutch has two sides, one of which is connected to the toothed wheel. A positive-engagement transmission is engaged between the other side of the clutch and the wheel. This transmission can be a toothed-belt drive.

The member according to the invention can include an endless belt formed with an endless row of holes forming the respective entrainment formations and having a stretch extending parallel to and in engagement with the inner face of the traction element. Here the body is a toothed wheel over which the endless belt is spanned. Again, a releasable torque-transmitting clutch has two sides, one of which is connected to the toothed wheel, and a positive-engagement transmission is engaged between the other side of the clutch and the wheel.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
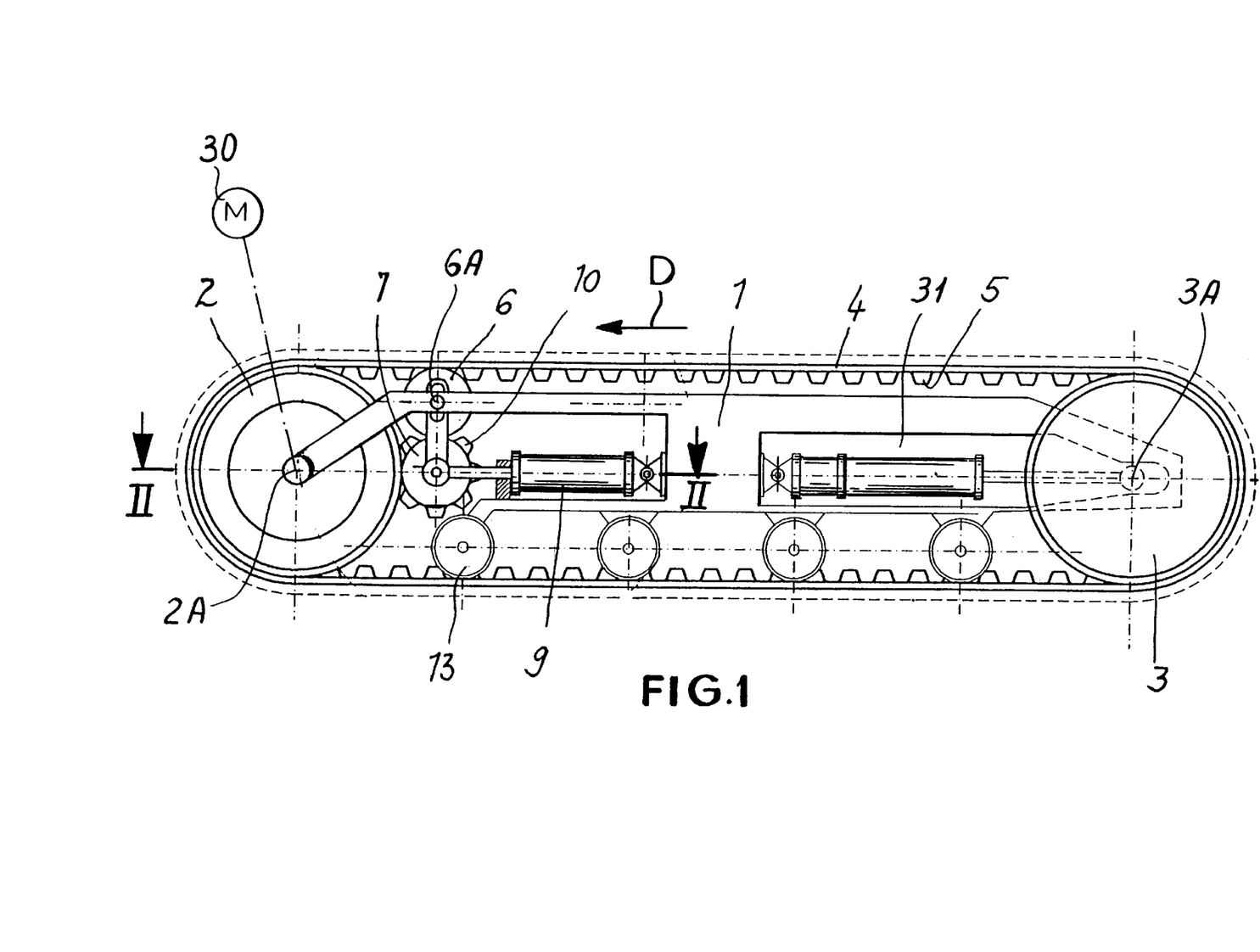
FIG. 1 is a partly diagrammatic side view of a tracked-vehicle drive according to the invention.
Figure 2:
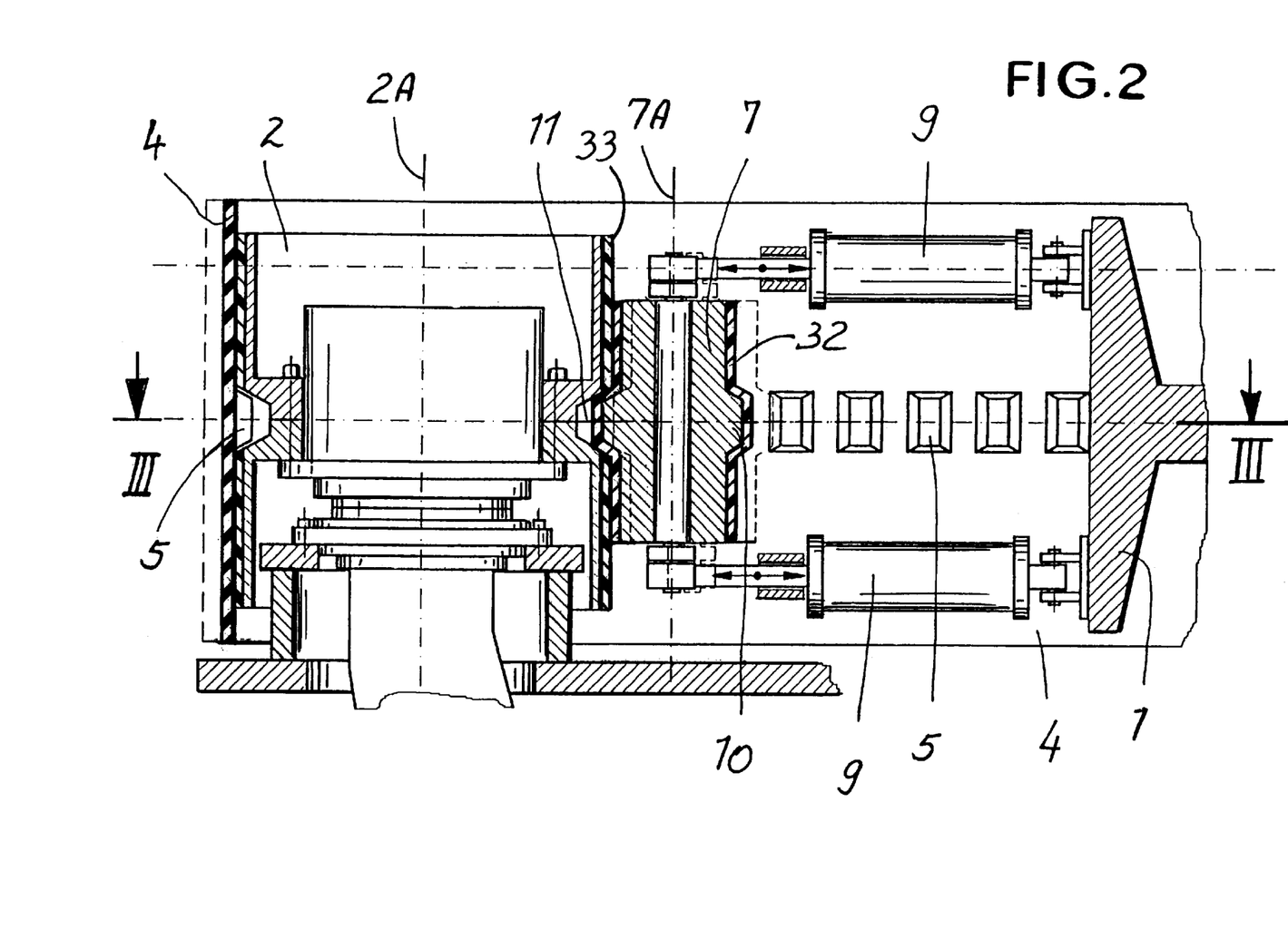
FIG. 2 is a section taken along the plane of line II—II of FIG. 1.
Figure 3:
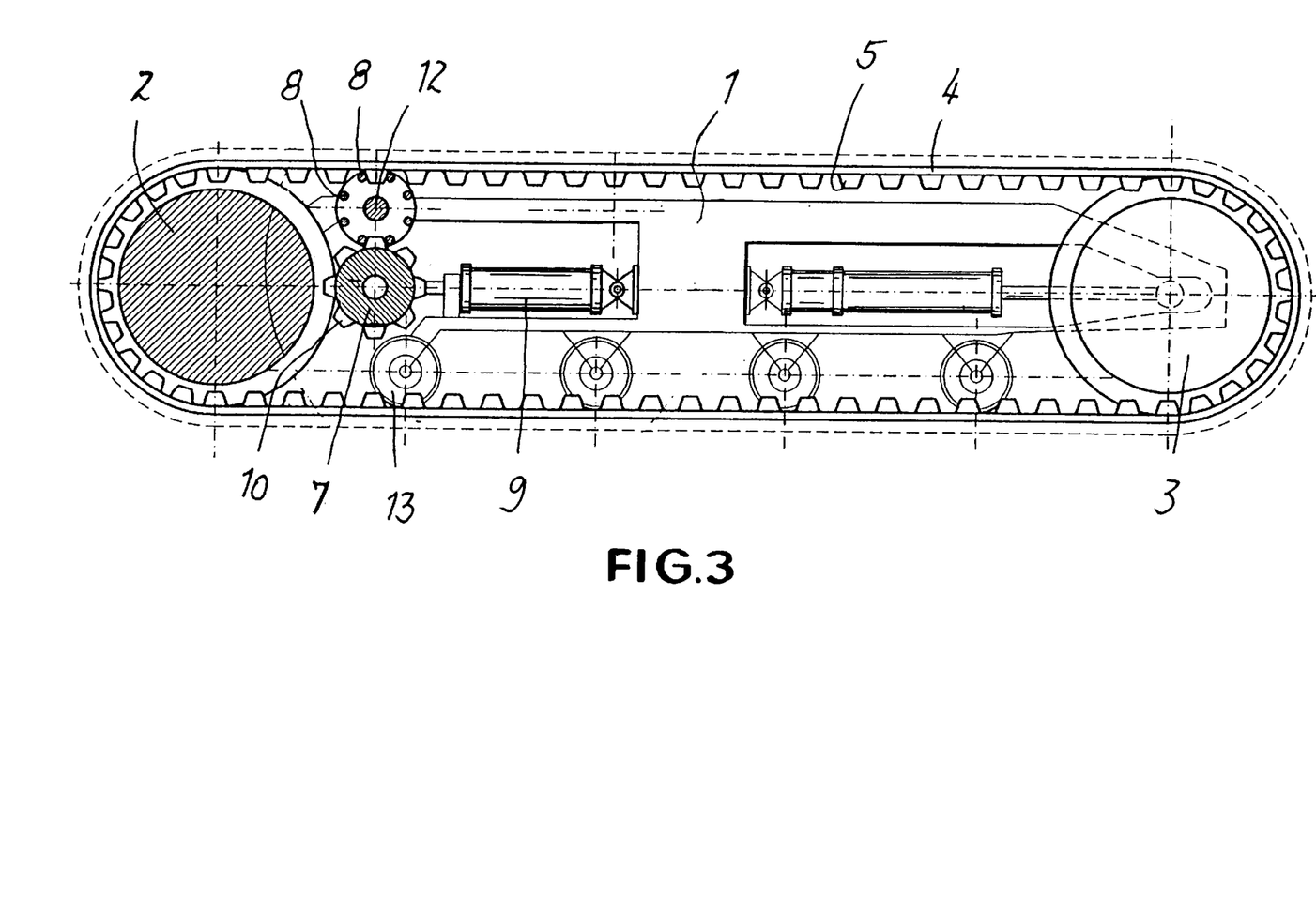
FIG. 3 is a section taken along line III—III of FIG. 2.

As seen in FIGS. 1, 2, and 3, a tracked-vehicle drive according to the invention is mounted on a vehicle frame 1 and has a drive wheel 2 rotatable about a horizontal axis 2A normally transverse to a standard travel direction D and a rear wheel 3 rotatable about a parallel axis 3A and normally urged backward in the direction D by a hydraulic actuator 31 so as to keep an endless elastomeric element 4 spanned over the two wheels 2 and 3 taut. This element 4 has a smooth inner surface engaging smooth cylindrical outer surfaces of the wheels 2 and 3 and is formed with an endless row of inwardly projecting teeth 5 that pass through annularly continuous grooves 11 formed in these wheels 2 and 3. An engine indicated schematically at 30 normally rotates the front wheel 2 counterclockwise as seen in FIG. 1 so as to advance the lower stretch of the drive element 4 in the direction D and the top stretch in the opposite direction. During such normal operation the teeth 5 pass along the grooves 11, serving mainly to keep the element 4 from slipping axially off either of these wheels 2 and 3. Grooved ground wheels 13 engage the lower stretch as is known in the art.

According to the invention a drive member or roller 6 rotatable on the frame about an axis 6A of a shaft 12 parallel to the axis 2A is formed by a pair of plates bridged by a series of pins 8 forming entrainment formations in constant mesh with the teeth 5 of the element 4. Thus this roller 6 rotates at a peripheral speed which is identical to the advance speed of the element 4.

A coupling body 7 formed as another wheel or roller is rotatable about an axis 7A and is formed with an endless row of radially outwardly projecting teeth 10 of the same size and spacing as the teeth 5 and meshing with the entrainment formations 8 of the roller 6. Thus this wheel 7 also rotates synchronously with the roller 6 since the teeth 10 are in permanent mesh with the formations 8.

A hydraulic cylinder 9 fixed on the frame 1 can displace the body 7 limitedly radially of the axis 2A, between the position illustrated in FIG. 2 in which an elastomeric layer 32 on its outer surface engages an elastomeric layer 33 on the outer surface of the wheel 2, without, however, the teeth 10 leaving mesh with the formations 8. In this engaged or coupling position, the body 7 will rotate synchronously with the wheel 2 and this rotation will be transmitted via the roller 6 to the element 4.

Thus if, for instance, the wheel 2 gets wet so that the frictional engagement between it and the element 4 is not enough and the element 4 starts to slip on the wheel 2, the actuator 9 can be engaged to press the body 7 forcibly against the wheel 2 to positively couple the element 4 to the wheel 2. The force with which the body 7 engages the wheel 2 can be much more than the force with which the element 4 engages this wheel 2 so that slip can largely be eliminated, even if the wheel 2 is wet.

Figure 4:
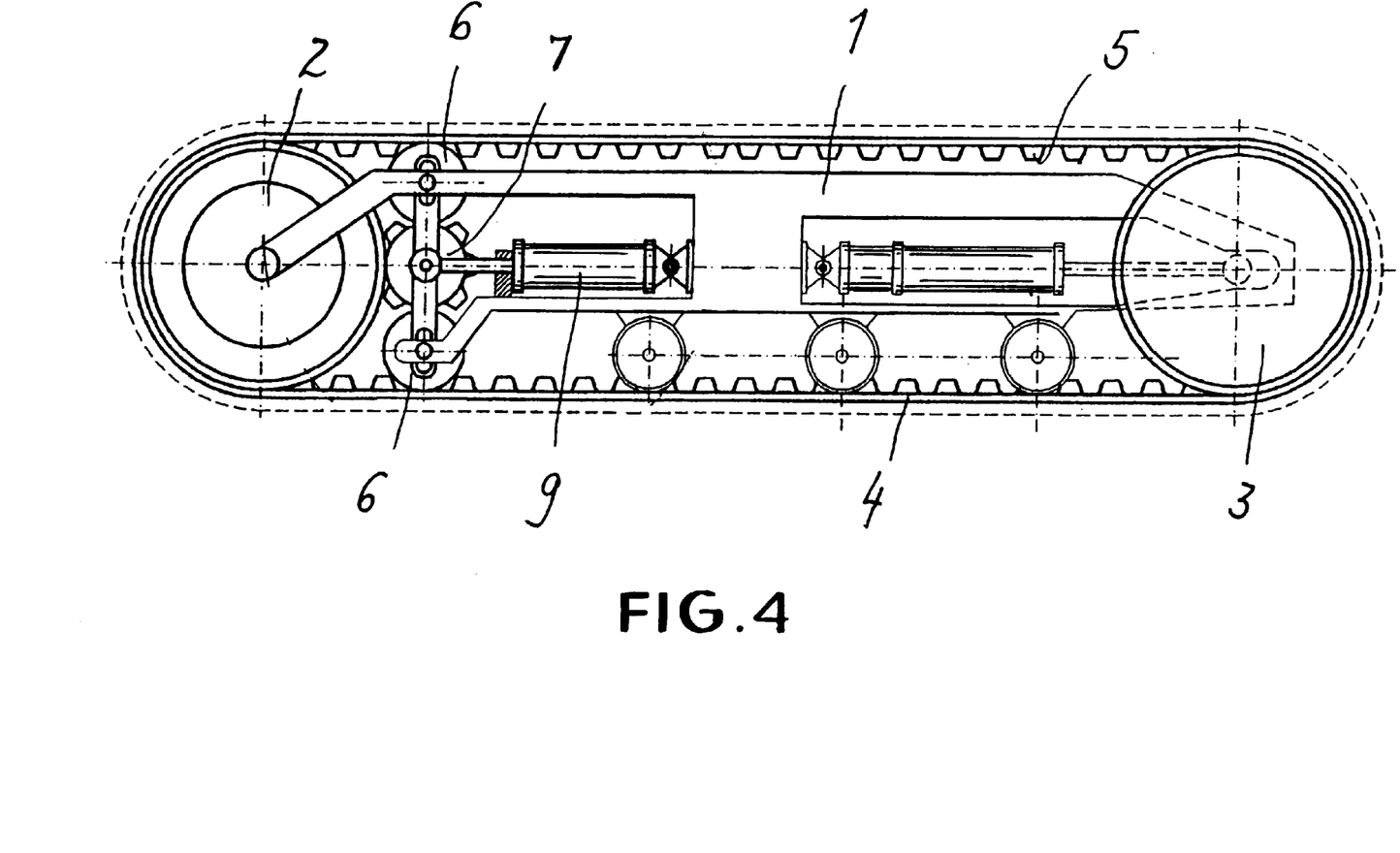
FIG. 4 is a view like FIG. 1 of a second embodiment of a tracked-vehicle drive according to the invention.
Figure 5:
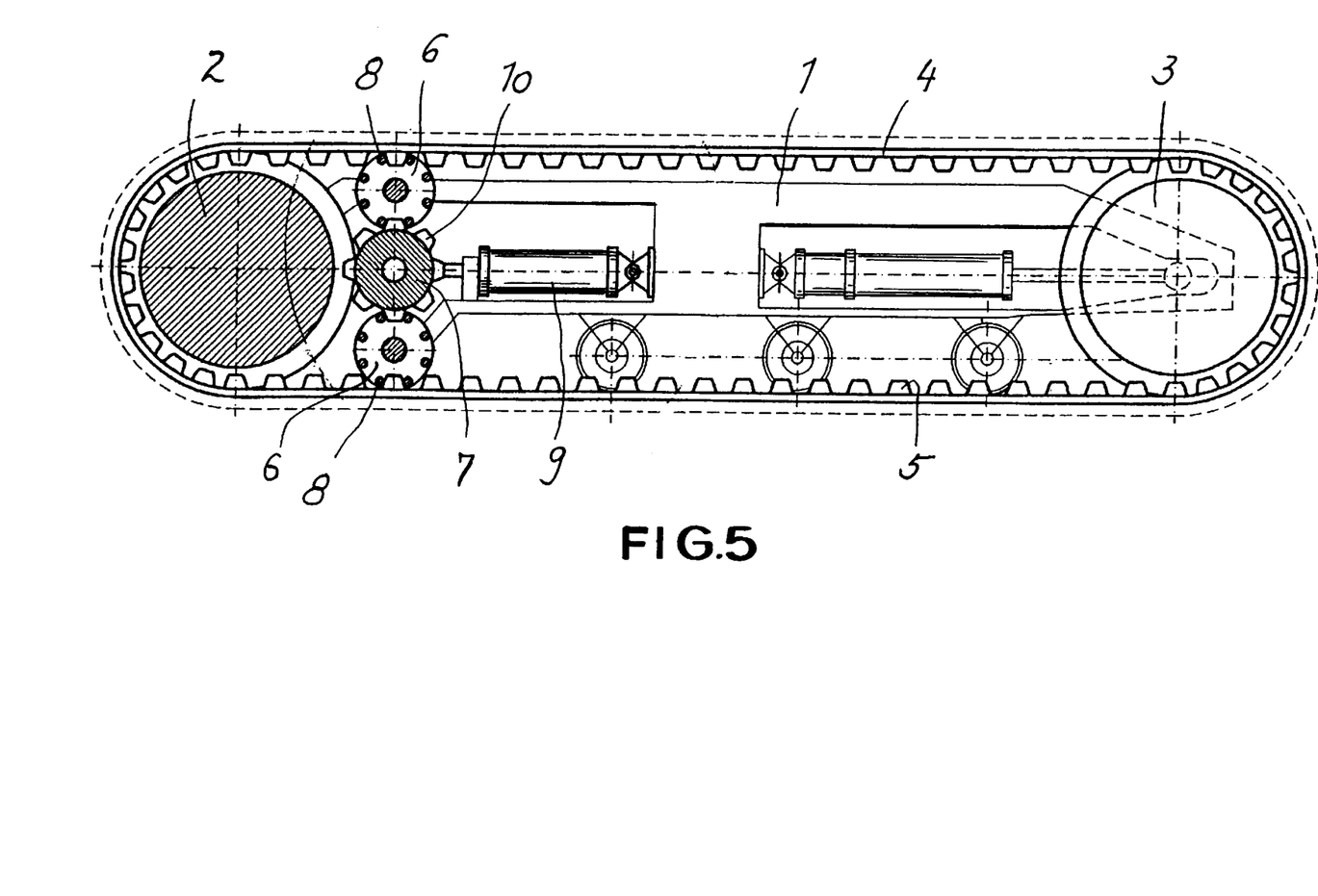
FIG. 5 is a section like FIG. 3 through the second embodiment.

In the arrangement of FIGS. 4 and 5 one of the ground wheels 13 is replaced by another such drive roller 6 so that both stretches of the element 4 are driven when the auxiliary drive is switched in by pressing the body 7 against the wheel 2.

Figure 6:
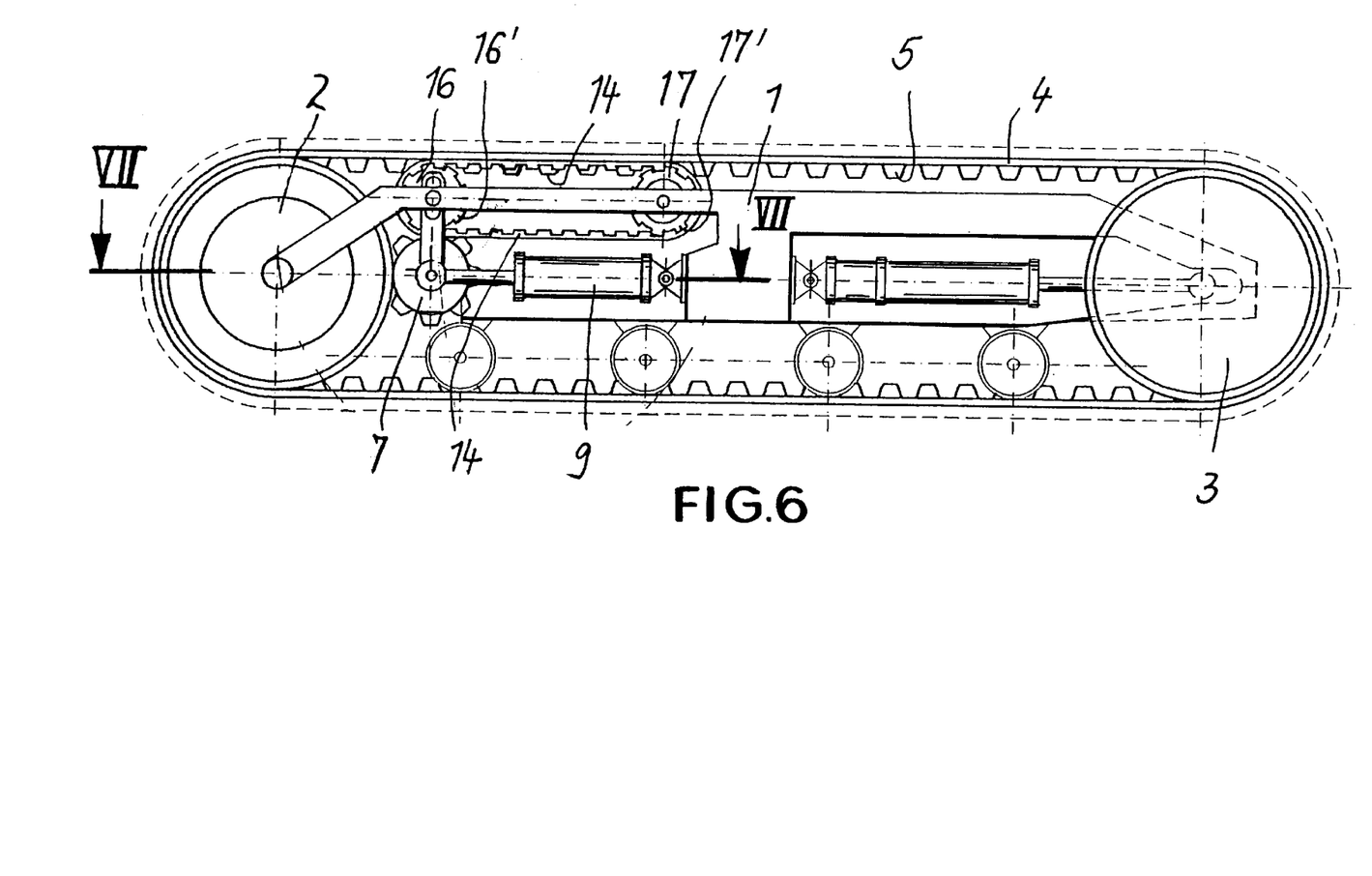
FIG. 6 is a view like FIG. 1 of a third embodiment of a tracked-vehicle drive according to the invention.
Figure 7:
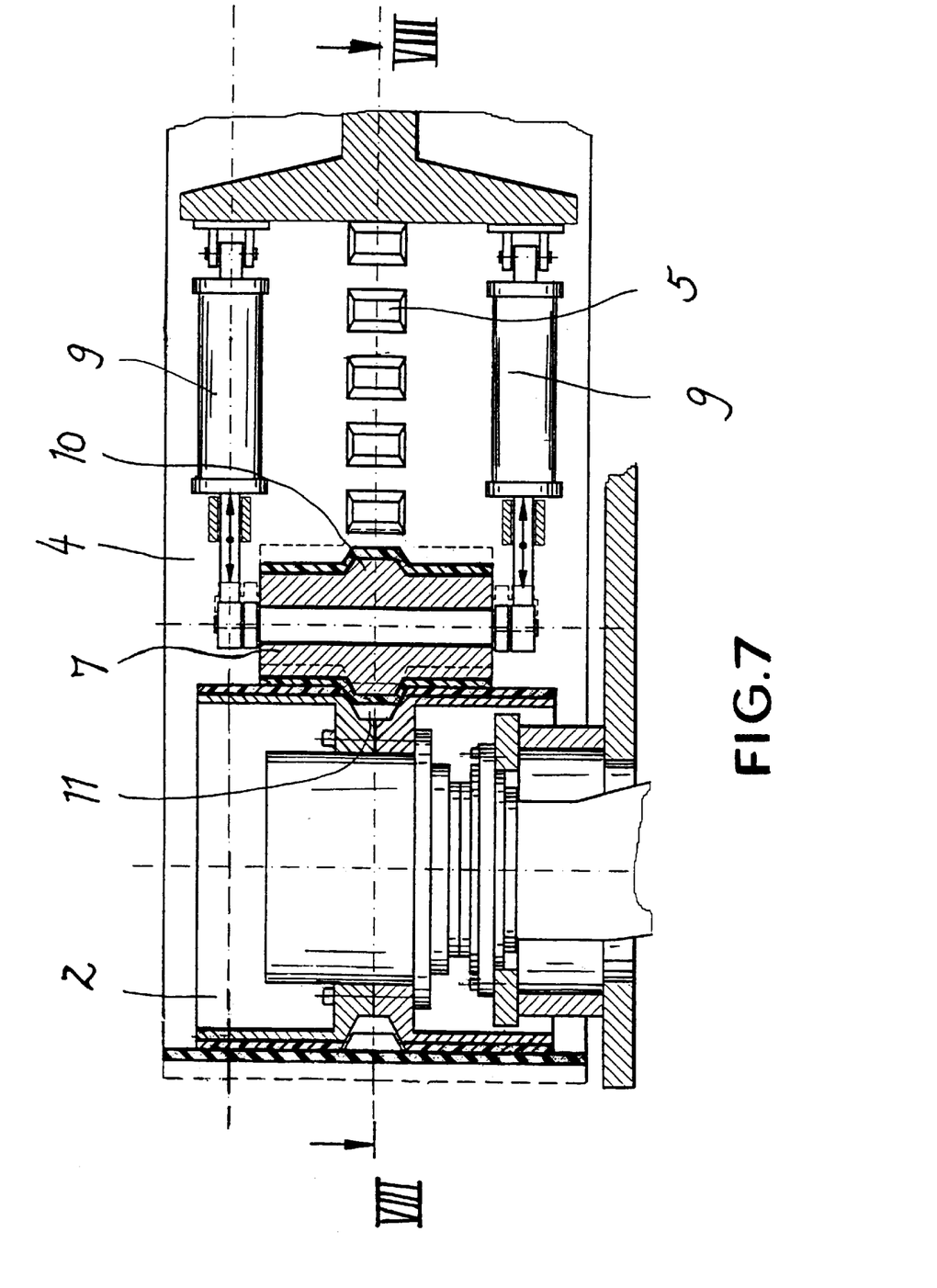
FIG. 7 is a section taken along line VII—VII of FIG. 6.
Figure 8:
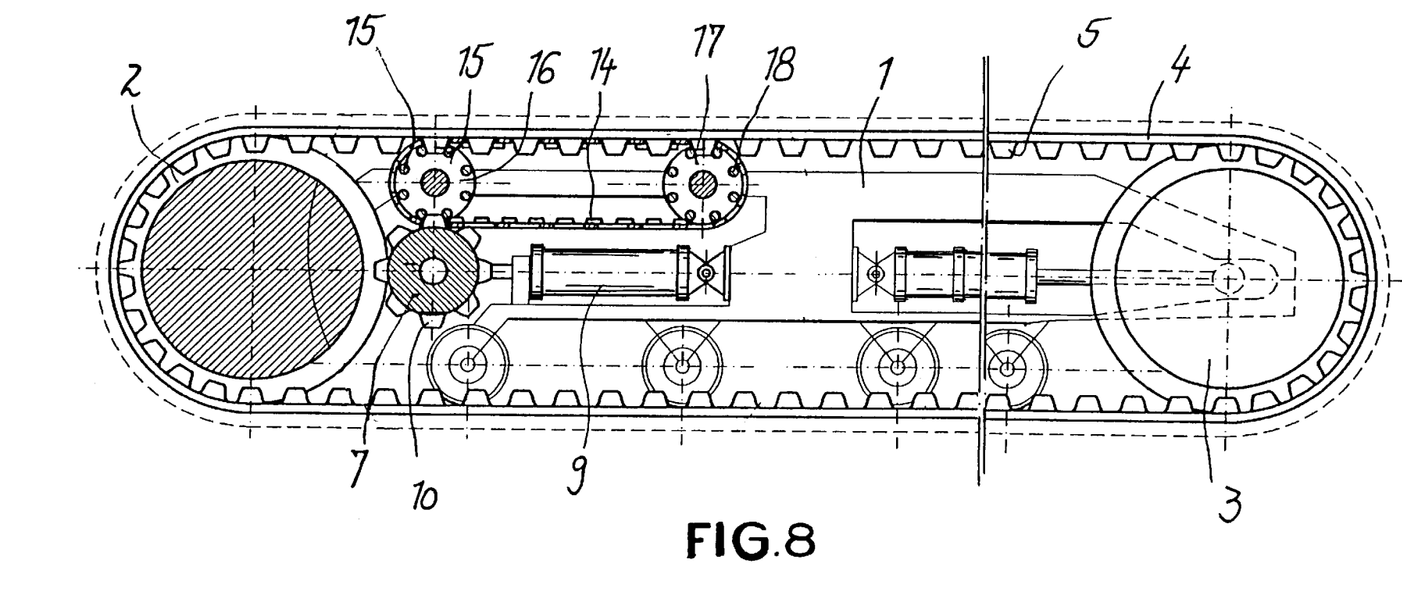
FIG. 8 is a section taken along the plane of line VIII—VIII of FIG. 7.

The system of FIGS. 6, 7, and 8 replaces the roller 6 with a holed and internally toothed belt 14 spanned over a pair of wheels or rollers 16 and 17 fixed on the frame 1 and having teeth 16' and 17'. Each such roller 16 and 17 is formed by a pair of externally toothed spaced plates bridged by an annular array of pins 18 forming entrainment formations between which can engage the teeth 5 of the element 4 and the teeth 10 of the body 7. As in FIGS. 1–3, the body 7 remains in mesh with the entrainment formations 18 as it is moved by the actuator 9 between the coupling position bearing on the wheel 2 and the decoupling position out of engagement with the wheel 2.

Figure 9:
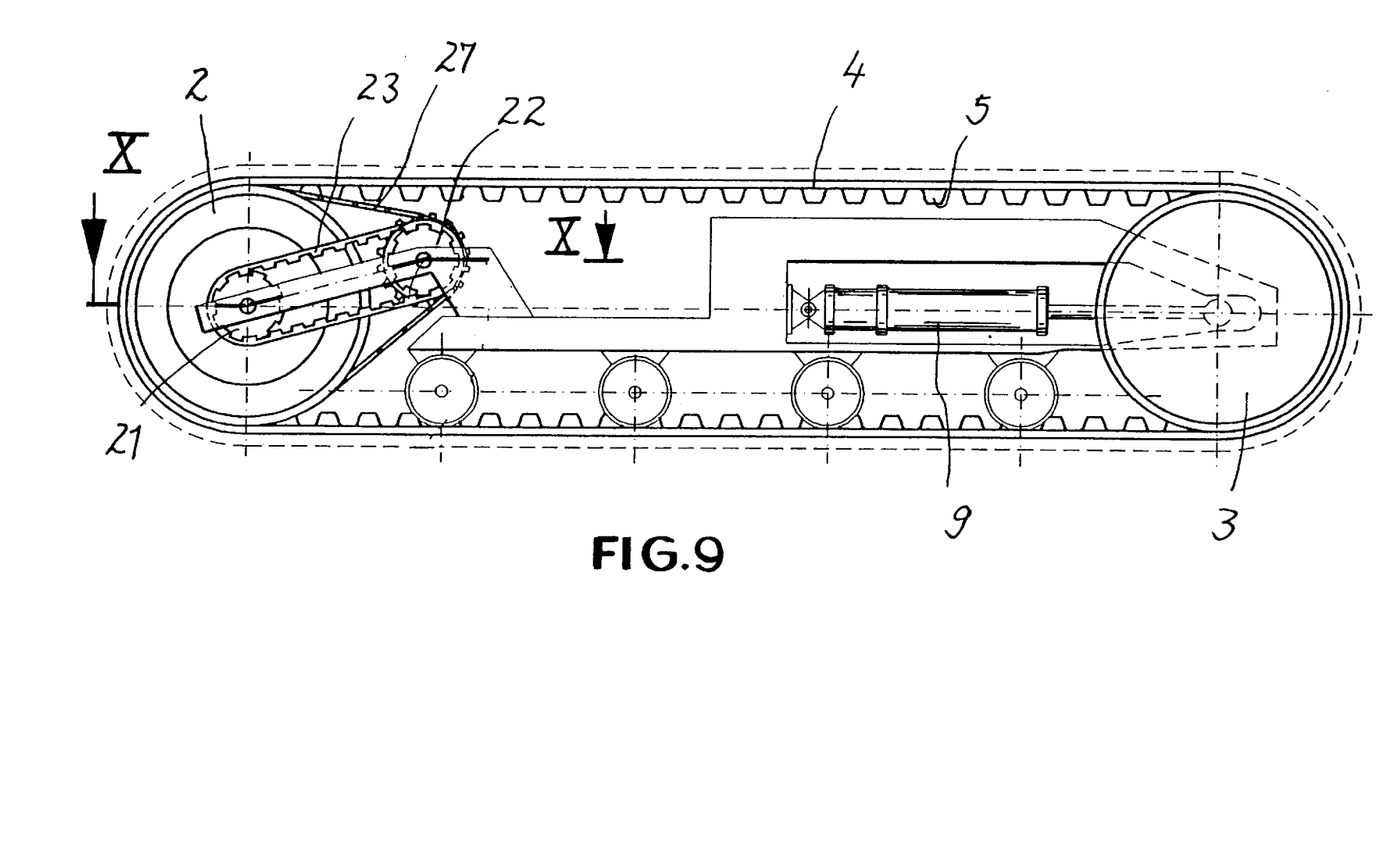
FIG. 9 is a view like FIG. 1 of a fourth embodiment of a tracked-vehicle drive according to the invention.
Figure 10:
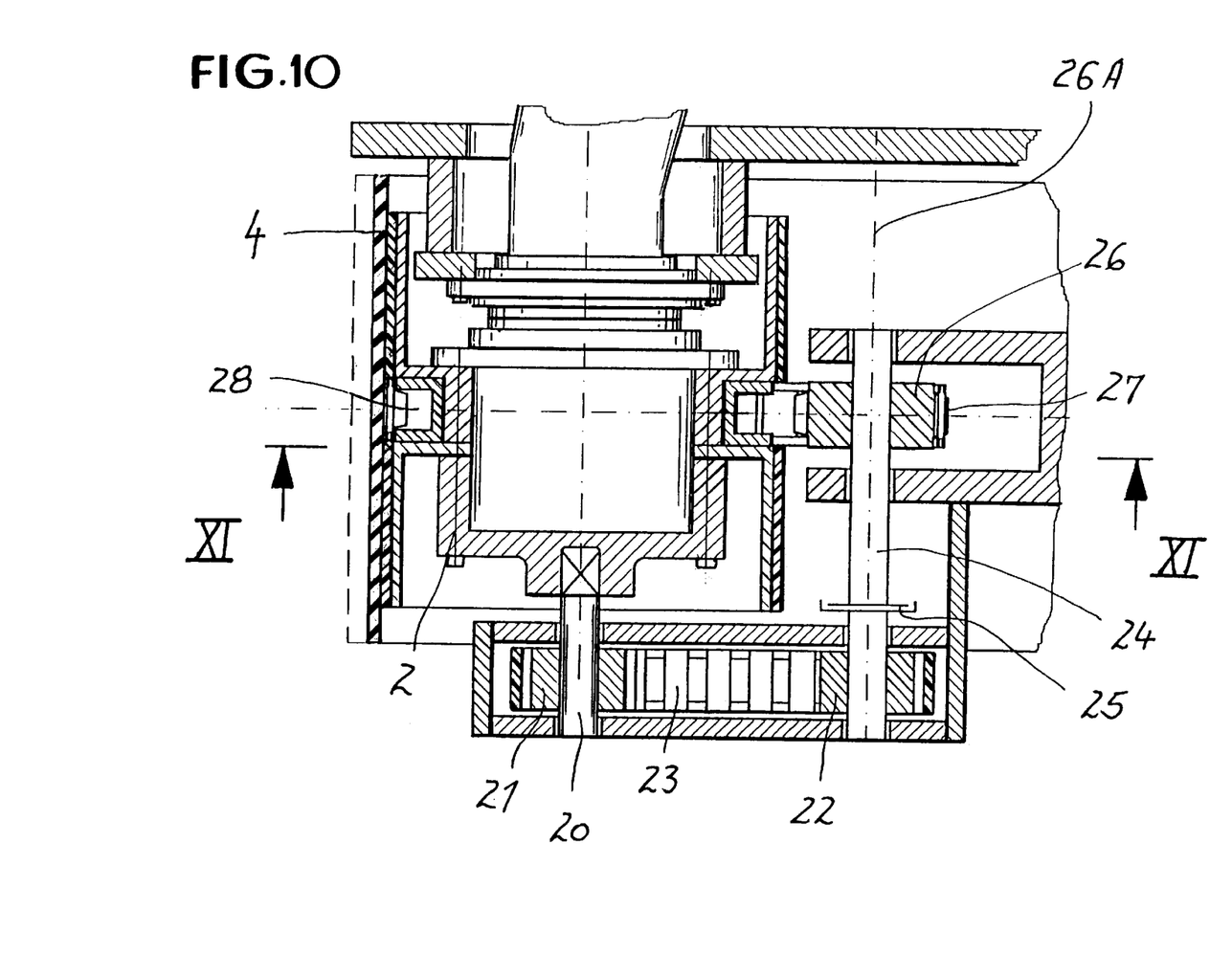
FIG. 10 is a section taken along line X—X of FIG. 9.
Figure 11:
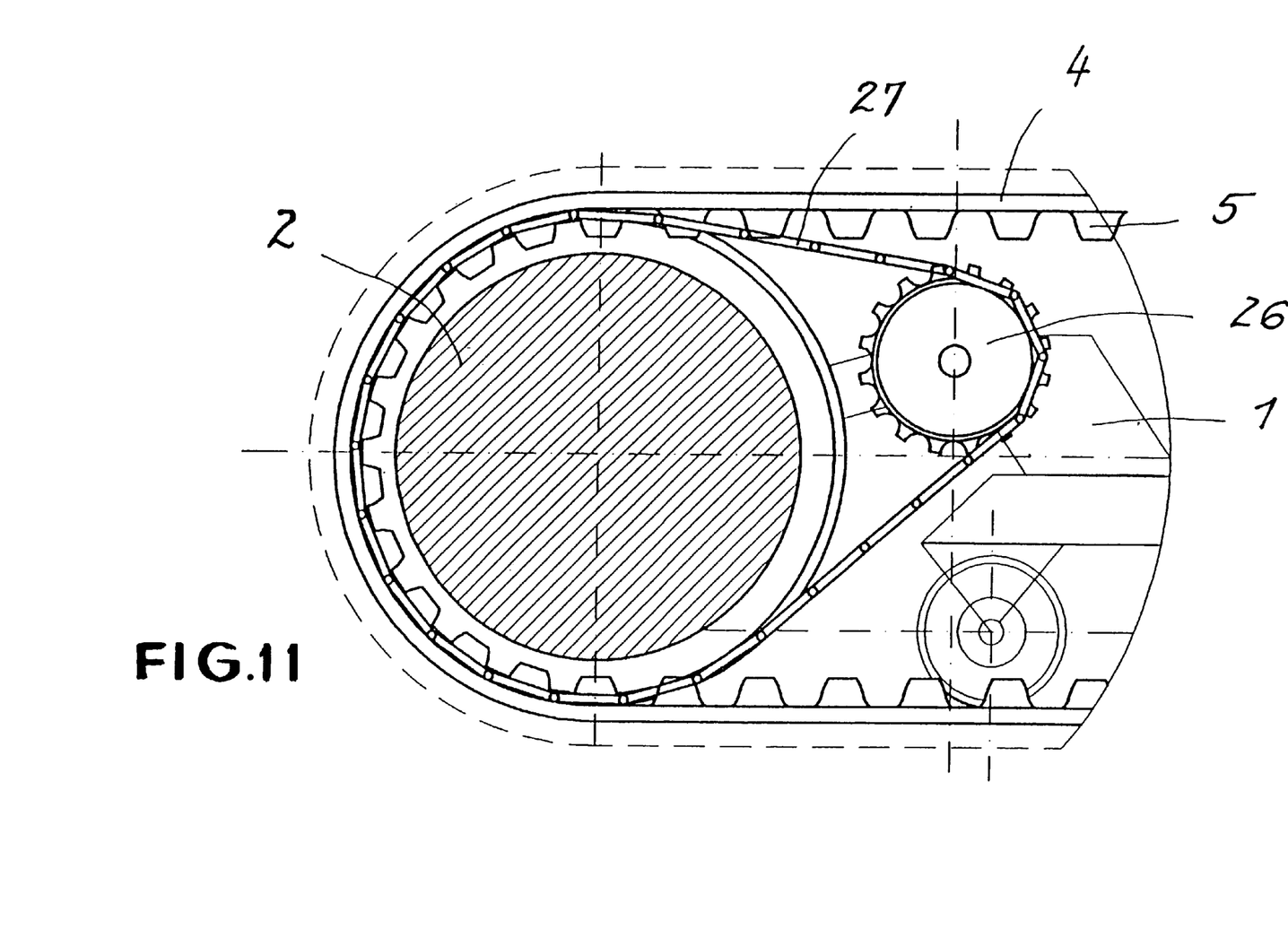
FIG. 11 is a section taken along the plane of line XI—XI of FIG. 10.

In the arrangement of FIGS. 9, 10, and 11 the drive member is a perforated belt 27 that is spanned over the wheel 2, with its perforations meshing with the teeth 5 of the member 4, and over a roller 26 mounted on a shaft 24 fixed in the frame 1 for rotation about an axis 26A fixed relative to the axis 2A. This shaft 24 is connected via a clutch 25 to one toothed wheel 22 of a belt drive comprising another toothed wheel 21 mounted on a shaft 20 fixed to the wheel 2 at the axis 2A and a toothed belt 23 spanned over the wheels 21 and 22. Thus when the clutch 25 is closed the roller 26, which has teeth meshing with the belt 27, is positively coupled to the wheel 2 for positive driving of the element 4.

Figure 12:
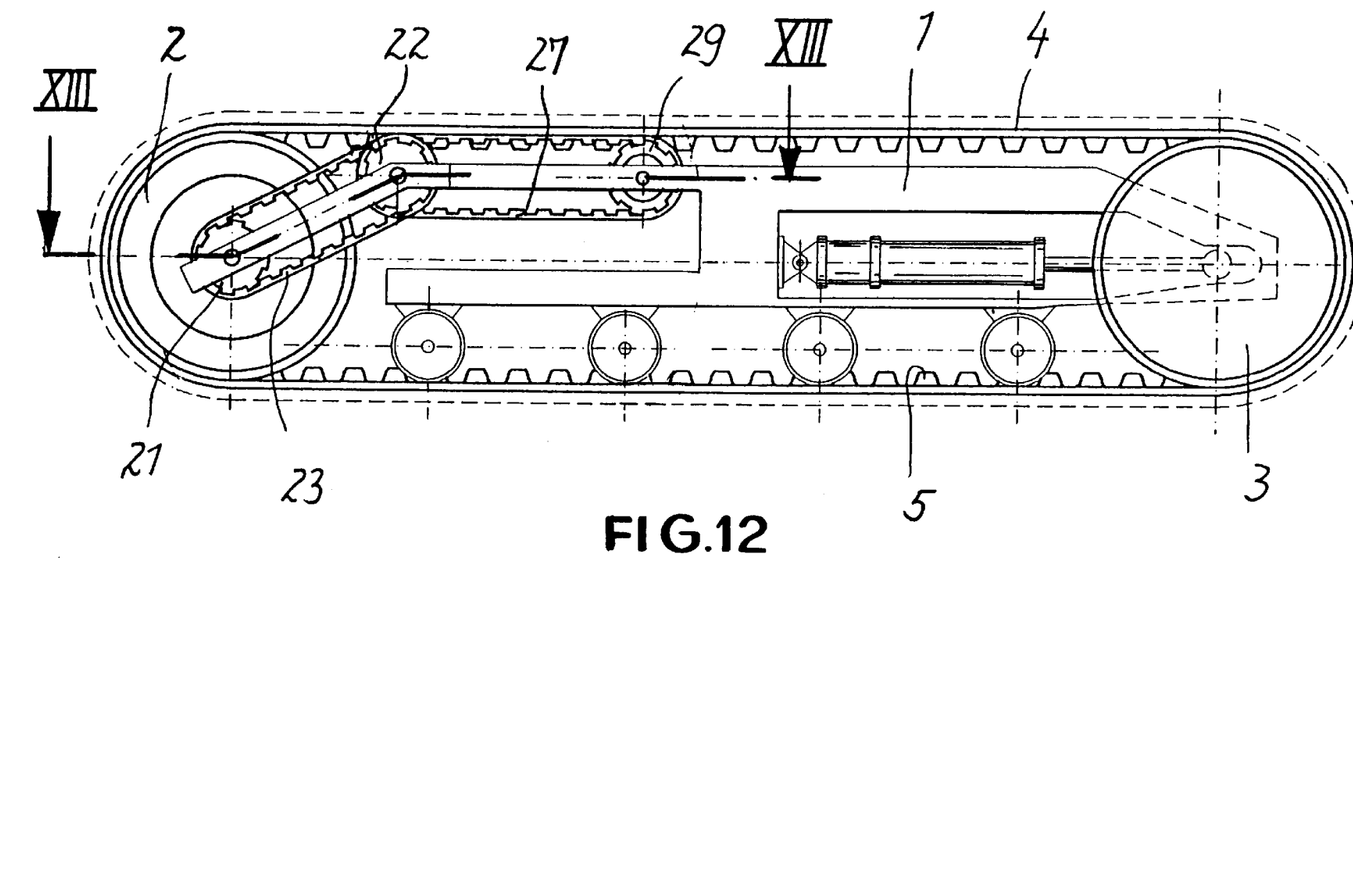
FIG. 12 is a view like FIG. 1 of a fifth embodiment of a tracked-vehicle drive according to the invention.
Figure 13:
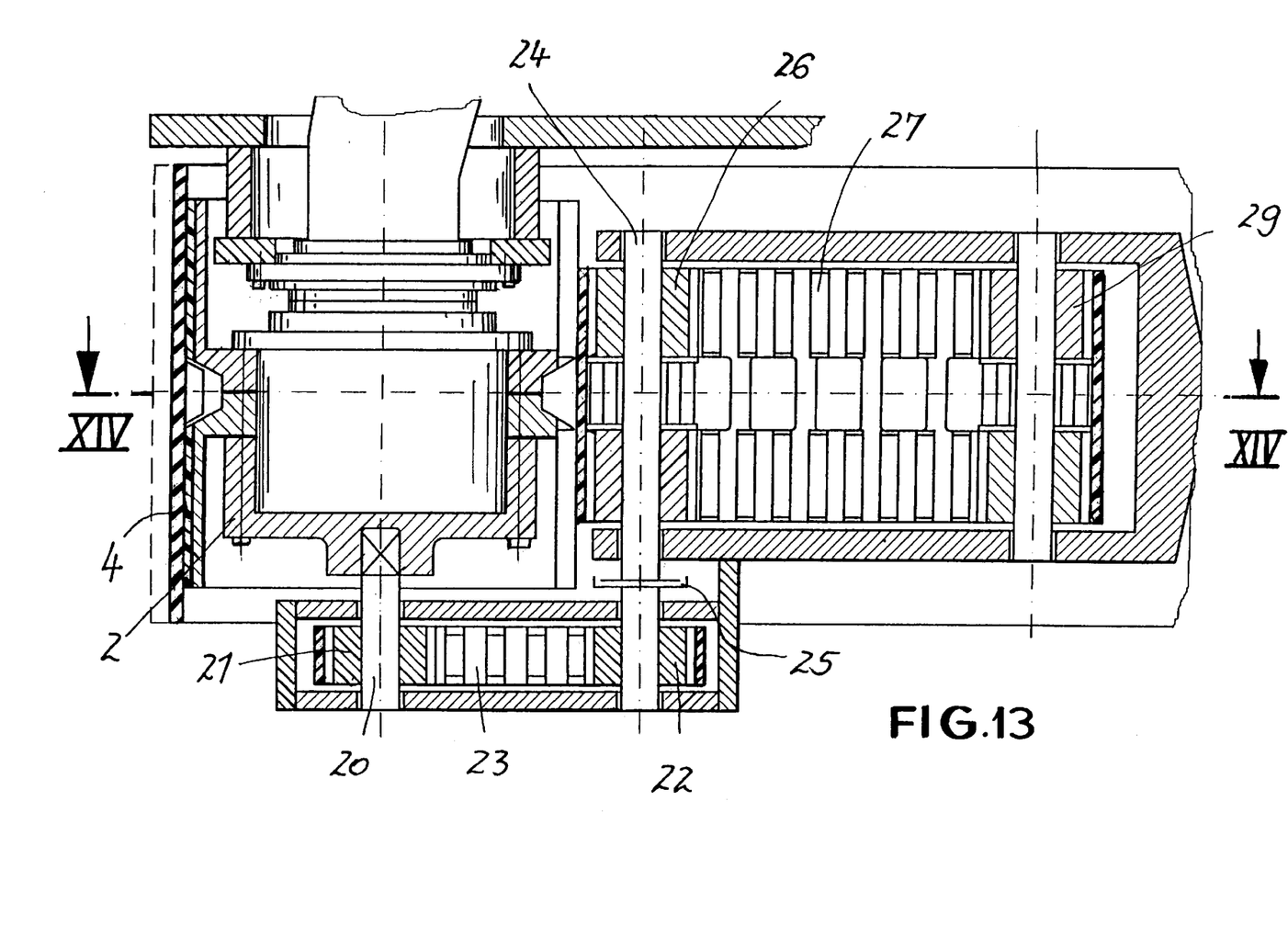
FIG. 13 is a section taken along the plane of line XIII—XIII of FIG. 12.
Figure 14:
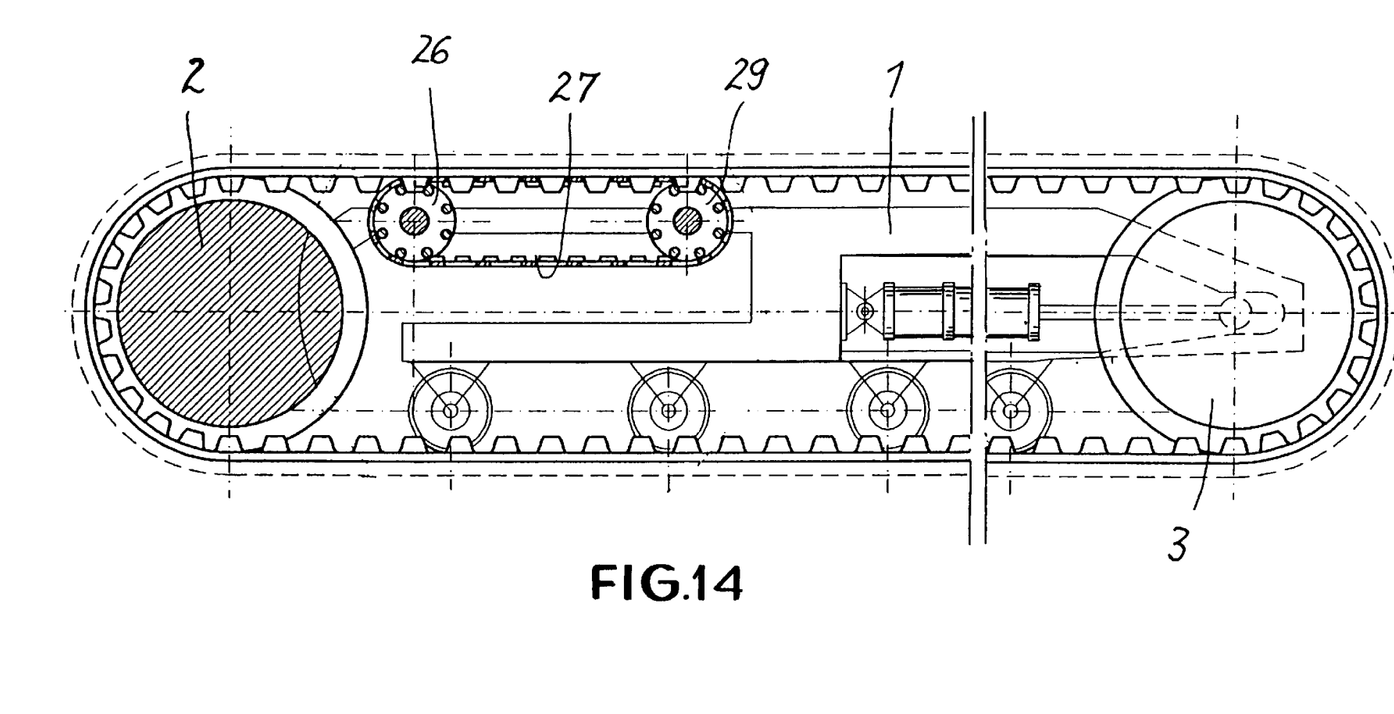
FIG. 14 is a section taken along the plane of line XIV—XIV of FIG. 13.

The system of FIGS. 12, 13, and 14 is similar to that of FIGS. 9–11, but here the belt 27 is not spanned over the wheel 2 but instead is spanned over another wheel 29 so that an upper stretch of this belt 27 runs along the inner face of the belt or element 4 offset from the wheel 2, as in FIGS. 6–8.

In all embodiments the positive coupling effected by the actuator 9 or clutch 25 is capable of transmitting much more torque from the wheel 2 to the element 4 than the normal frictional contact of this wheel 2 with the somewhat elastic element 4.

We claim:

1. A tracked-vehicle drive comprising:
   a wheel rotatably driven about an axis and having an outer surface;
   an endless traction element spanned over and frictionally engaging the wheel so as to be advanced thereby when the wheel rotates and having an inner face formed with an endless row of spaced teeth;
   an auxiliary drive member displaceable adjacent the traction element and formed with an endless row of spaced entrainment formations in constant mesh with the teeth, whereby the drive member is displaced synchronously with the traction element;

a coupling body having entrainment formations in constant mesh with the drive-member entrainment formations and engageable with the wheel outer surface; and means for coupling the body to the wheel for positive driving of the traction element from the wheel via the member and body and for decoupling the body from the wheel for frictional coupling of the traction element by the wheel.

2. The tracked-vehicle drive defined in claim 1 wherein the body is a roller radially engageable with the wheel and the entrainment formations of the body are teeth spaced like the teeth of the wheel.

3. The tracked-vehicle drive defined in claim 2 wherein the wheel is formed with an endless radially outwardly open continuous groove in which the teeth of the element engage, the teeth of the body engaging in the groove when the body is coupled to the wheel.

4. The tracked-vehicle drive defined in claim 2 wherein the body is provided with an outer soft friction-enhancing layer.

5. The tracked-vehicle drive defined in claim 2 wherein the member is a roller formed with pockets complementary to the teeth.

6. The tracked-vehicle drive defined in claim 5 wherein the drive has a pair of such drive members oppositely flanking the body and engaged with different stretches of the element.

7. The tracked-vehicle drive defined in claim 2 wherein the means is an actuator operable to displace the body radially of the wheel.

8. The tracked-vehicle drive defined in claim 2 wherein the drive has a pair of such drive members.

9. The tracked-vehicle drive defined in claim 1 wherein the member includes an endless belt formed with an endless row of holes forming the respective entrainment formations, and a pair of rollers over which the belt is spanned and forming in the belt a stretch extending parallel to and in engagement with the inner face of the traction element.

10. The tracked-vehicle drive defined in claim 1 wherein the member is an endless belt spanned over the wheel and formed with an endless row of holes forming the respective entrainment formations, the body being a toothed wheel over which the endless belt is spanned, the coupling means including;

a releasable torque-transmitting clutch having two sides one of which is connected to the toothed wheel, and a positive-engagement transmission engaged between the other side of the clutch and the wheel.

11. The tracked-vehicle drive defined in claim 10 wherein the transmission is a toothed-belt drive.

12. The tracked-vehicle drive defined in claim 1 wherein the member includes an endless belt formed with an endless row of holes forming the respective entrainment formations and having a stretch extending parallel to and in engagement with the inner face of the traction element, the body being a toothed wheel over which the endless belt is spanned, the coupling means including;

a releasable torque-transmitting clutch having two sides one of which is connected to the toothed wheel, and a positive-engagement transmission engaged between the other side of the clutch and the wheel.

* * * * *